Figure 1:
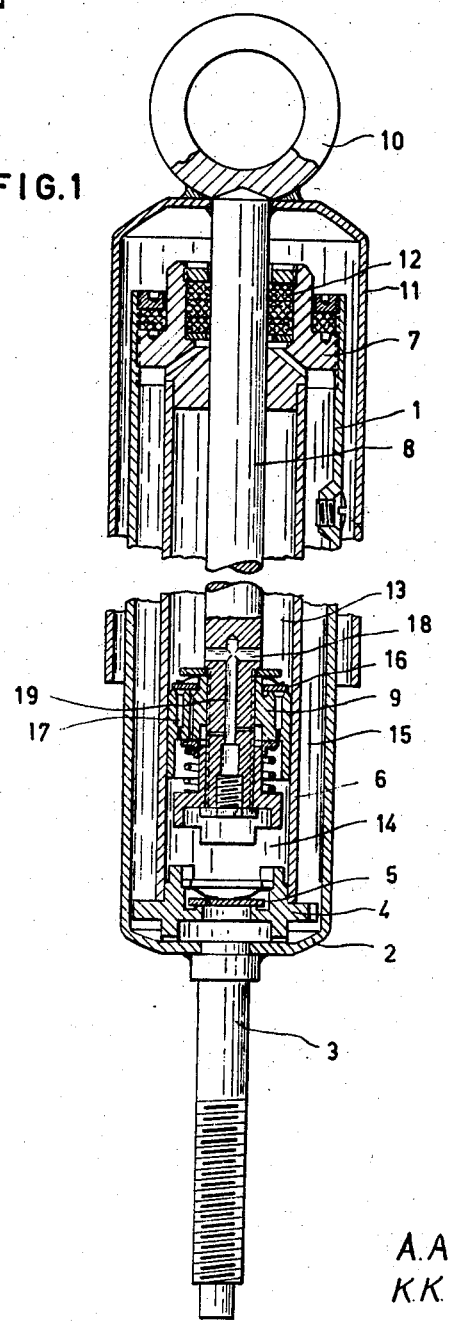

May 26, 1959

A. A. DE KONING ET AL 2,888,107

SHOCK ABSORBER

Filed May 17, 1954

4 Sheets-Sheet 1

A.A. DE KONING AND
K.K.K. DE KONING

INVENTORS

BY Wenderoth, Lind & Ponack
ATTORNEYS

May 26, 1959 A. A. DE KONING ET AL 2,888,107
SHOCK ABSORBER
Filed May 17, 1954 4 Sheets-Sheet 4

A.A. DE KONING
AND K.K.K. DE KONING
INVENTORS

BY Wenderoth, Lind & Ponack
ATTORNEYS

United States Patent Office 2,888,107
Patented May 26, 1959

---

2,888,107

SHOCK ABSORBER

Arie A. De Koning and Kornelis K. K. De Koning, Oud-Beijerland, Netherlands

Application May 17, 1954, Serial No. 430,314

Claims priority, application Netherlands May 18, 1953

7 Claims. (Cl. 188—88)

Our invention relates to a shock absorber of the type comprising a cylinder, a piston connected to a piston rod and mounted for reciprocal movement in said cylinder, said piston dividing the space within the cylinder into two chambers and being provided with a passage connecting said chambers.

It is an object of our invention to provide a shock absorber which is especially suitable for motor vehicles and which operates without any noise.

Another object of the invention is a shock absorber which in operation enables damping of shocks and vibrations, said damping increasing substantially proportionally to the speed of movement of the piston during the inward stroke as well as during the outward stroke thereof.

A further object of the invention is a shock absorber which can be adjusted to compensate for wear and tear of the parts and to prevent oil losses.

According to one feature of our invention the passage in the piston is connected to an additional chamber, which in turn communicates with the chambers on both sides of the piston through a narrow channel.

Said additional chamber can be formed in different ways, as will be described with reference to the embodiments shown in the drawings.

The passage in the piston preferably cooperates with an annular valve. This valve requires special attention and should not stick to its seat.

Figure 7:
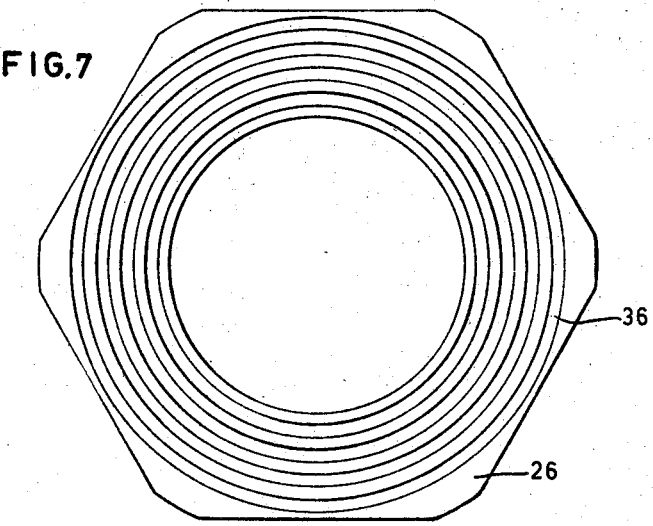
Figure 8:

In the drawings:

Figure 1 is a longitudinal section of a shock absorber according to our invention;

Figures 2 to 6 inclusive represent longitudinal sections of several embodiments of pistons for shock absorbers according to the invention;

Figures 7 and 8 illustrate the construction of annular valves.

The shock absorber according to Figure 1 is provided with an outer cylinder 1 comprising a bottom 2 to which is connected an eye or a connecting rod 3 for connection of the shock absorber to part of a motor vehicle or the like. A housing 4 for a relief valve 5 is mounted near said bottom 2 and connected to a working cylinder 6 and a cover 7 for the outer cylinder 1. Said cover 7 is shaped as a nut. A piston rod 8 passes through said nut. One end of said rod 8 is connected to a piston 9 which is provided with valves. The other end of the piston rod 8 is connected to a sleeve 11. To said sleeve an eye 10 is secured, e.g. by welding. The cover 7 is provided with a suitable seal against oil leakage.

Figure 2:
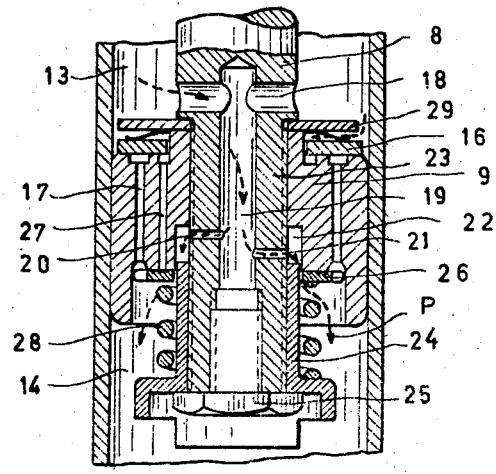

The interior of the cylinder 6 is divided by the piston 9 into two chambers 13 and 14. The annular space 15 between the cylinders 1 and 6 constitutes a reservoir for absorber fluid such as mineral oil. The chambers 13 and 14 are completely filled with this fluid, whereas the annular space 15 is only partially filled therewith. During the outward stroke of the piston 9 and the rod 8 pressure is exerted on the oil in chamber 13. An annular valve 16 then closes longitudinal bores 17 in the piston 9. Oil from chamber 13 can escape through access ports in the form of radial bores 18 and through an axial bore 19 in the piston rod 8. Said axial bore 19 is connected by flat restricting passageways in the form of fine bores 20 and 21 (Figure 2) with an additional chamber 22. The holes 20 and 21 are fine radial holes in the piston rod and they are located in off set position along the axial length of the rod. Both holes end in a screw threaded part of the piston rod 8. On this screw-threaded part an adjusting member 24 is adjustably mounted. Said member is locked by means of a screw 25. Oil from chamber 22 can flow, as seen in Figure 2, through a flow restricting aperture in the form of a narrow annular slot between the member 24 and a further annular valve 26 to chamber 14 in the direction of arrow $p$ (Figure 2) when the piston is raised in Figure 1. The annular valve 26 controls narrow longitudinal channels 27 in piston 9 and is urged onto a seat by means of a spring 28 (Figure 2).

During the inward stroke, in Figure 2 a downward stroke of the piston, the chamber 13 should be filled with oil and remain filled. This is achieved by the lifting of valve 16 and the flowing of oil from chamber 14 through the channel 17 to the chamber 13. Oil under pressure in chamber 14 during the inward stroke can escape from chamber 14 through the relief valve 5 into the annular space 15.

In Figure 2 a small annular gap is provided between the adjusting member 24 and the outer wall of the additional chamber 22. As seen, the chamber is defined by a recess in the piston 9 and the end of adjusting member 24.

Also between the member 24 and the annular valve 26 there is a narrow annular gap. During the outward stroke of piston 9, the pressure difference between the chambers 13 and 14 is compensated in two stages due to the presence of chamber 22. During the flow of the oil through the radial bores 20, 21 high flow speeds, e.g. up to 50 m./sec., occur. If this oil were allowed to flow from the bores 20, 21 directly into the chamber 14, where the static head is much lower than one atmosphere as a consequence exerted by the suction of the piston, cavitation near the outflow aperture is likely to occur. This causes a rustling noise. If, however, the oil first flows into the small chamber 22, where the pressure is higher, and from there through a narrow channel to chamber 14, said cavitation and said noise are prevented. The ratio between the flow area through the bores 20, 21 and the annular gap between the chamber wall 22 and the set member 24 is carefully chosen, but is as a maximum 1:5. The flow from the second stage has a considerably lower speed, and since an annular gap is again used, the ratio between the wall area and the flow area here is very great, so that the energy of the outflowing oil is quickly exhausted as a consequence of the large contact area.

During the upward stroke in Figure 2, oil can flow from chamber 13 through the space between the annular valve 16 and the abutment ring and from this valve into the longitudinal bores 27. These bores are closed at their lower end by the annular valve 26. The valve 26 can open against the action of spring 28. This spring is supported on the set member 24.

Figure 3:
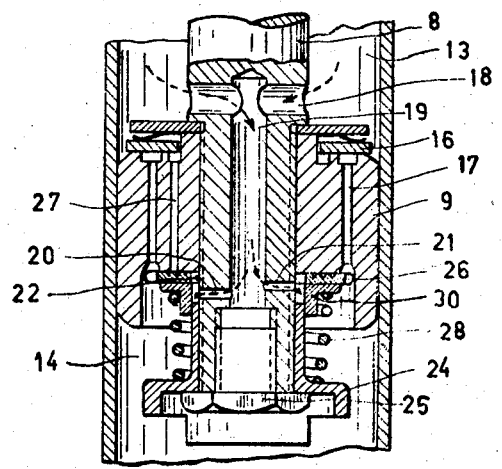

According to the embodiment shown in Figure 3 the chamber 22 is formed between the outer wall of the piston rod 8, the piston body 9, the annular valve 26 and a rubber ring 30, which ring can also be made of other material. The set member 24 constitutes the bottom of the chamber 22. Ring 30 is urged upwardly together with valve 26 by spring 28.

Figure 4:
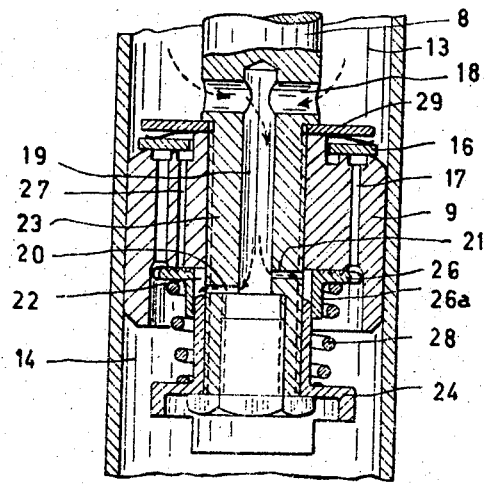

In the embodiment shown in Figure 4 the valve 26 is provided with a depending sleeve 26a, and this together with the outer surface of the piston rod 8 and the set member 24 forms the additional chamber 22. Between the inner wall of the sleeve 26a and the outer wall of the set member 24 there is a narrow annular gap.

Figure 5:
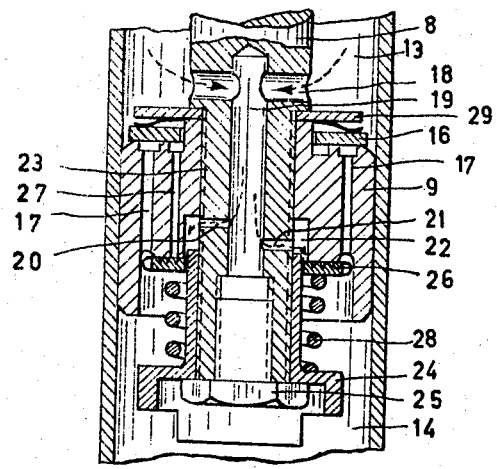

In the embodiment shown in Figure 5 the additional chamber 22 is again formed by a recess in the piston body 9. Here, however, the set member 24 has considerable backlash in said recess. Oil escapes from chamber 22 through a narrow annular gap between the outer wall of the set member 24 and the inner wall of valve 26.

Figure 6:
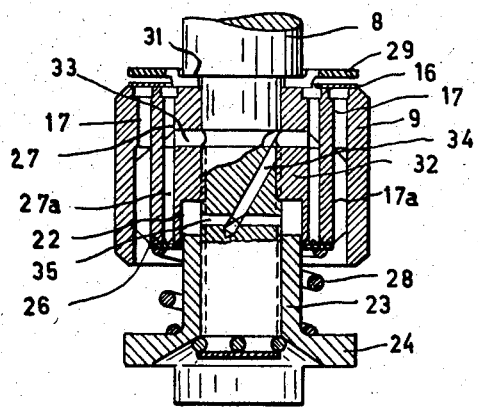

In the embodiment according to Figure 6 the piston body 9 together with the abutment ring 29 is secured against a shoulder 31 of the piston rod 8 by means of a nut 32, screwed on thread 23 on the piston rod. The nut 32 is provided with longitudinal bores 27a and circumferential grooves 17a. Here the bores 27 in the piston body have no important damping action, but they serve to supply ample oil to space 33.

From the space 33 oil is supplied to additional chamber 22 through the inclined bore 34 and the radial bore 35. Oil from chamber 22 can escape through a narrow annular gap around member 24 in the same manner as in Figure 2. In this embodiment the lock screw 25 is not needed.

The operation of annular valve 26 is of great importance. It is an object of the invention to get a damping operation which is substantially proportional to the speed of the piston movement. Such operation cannot be obtained by means of the bores in the piston rod alone. The flow speeds in these bores are so high that the flow therein will certainly be turbulent and the damping resistance will increase with the square of the speed. As a consequence of leakage along the piston and in the piston rod guide, where the flow will be substantially laminar, the damping is not proportional to $V^2$, but to $V^1$. Measures are necessary to obtain a more linear proportion.

The channels 27 are uniformly spaced in a circumferential direction around the piston body. They are closed at the lower end by the annular valve 26. This valve is supported against a smooth annular seat at the bottom of the piston body 9. The seat surface of the valve according to Figures 7 and 8 is provided with grooves, e.g. annular grooves 36, or is at least roughened by grooves or the like. At a certain pressure in chamber 13, which presure is transmitted in these grooves 36, the valve 26 is lifted from its seat. Then oil flows through channels 27 in the piston 9 and subsequently between the seat at the bottom of the piston and the roughened surface of the valve 26. This is a two dimensional flow, starting from the bores in the piston, radially in the direction of the valve periphery and tangentially through the grooves. Since the valve is a rigid body it is lifted along its entire periphery by the pressure. Thus oil can escape along the entire periphery. The flow towards the periphery takes place through the annular grooves. The radially outflowing oil, however, finds one or more checks on its path when passing the grooves and this means that the oil flow is braked.

During the tangential flow through the grooves the oil also meets with resistance.

Due to this construction of the valve seat, therefore, the valve is not only a closing member, but also a resisting member. At rather high flow speeds and substantial lifting of the valve, the flow velocity in the piston channels acts to increase the damping resistance.

By a careful choice of the size of the passages in the piston, the spring pressure and the groove in the valve seat, a shock absorber can be obtained having the required linear characteristic and noiseless operation.

The damping force can be further adjusted e.g. after some wear by screwing the set member 24 further on the piston rod 8, so that the narrow bores 20, 21 in the piston rod are more or less closed.

Having now described the several features of our invention and the objects thereof, what we claim is:

1. In a shock absorber having a cylinder and a piston slidable in said cylinder and mounted on the end of a piston rod which extends through said piston, that improvement comprising providing said piston rod with a hollow bore, access ports thereto and a plurality of flow restricting passageways, and further comprising means on the end of said piston rod cooperable with said piston to define a chamber having a narrow annular flow restricting aperature opening therefrom into said cylinder, said flow restricting passageways connecting the hollow bore and the said chamber.

2. The improvement as claimed in claim 1 in which said piston is provided with a downwardly opening internal recess adjacent the end of said piston rod, and said means comprise an adjusting member adjustably mounted on the end of said piston rod with one end movable within said recess, the walls of said recess, said adjusting member and said piston rod defining said chamber, said adjusting member being slightly less in diameter than said recess, whereby a narrow annular flow restricting aperture having a length greater than its breadth is formed between said adjusting member and the wall of the recess.

3. The improvement as claimed in claim 1 in which said piston is provided with a downwardly opening internal recess adjacent the end of said piston rod and with a plurality of longitudinal bores therethrough, and said means comprise an adjusting member adjustably mounted on the end of said piston rod with one end adjacent the downwardly opening recess, an annular valve seated against the piston over the ends of the bores and fitting around said adjusting member to leave a narrow annular flow restricting aperture having a length greater than its breadth between said annular valve and adjusting member, the walls of the recess, the end of the adjusting member, the piston rod and the inner periphery of the annular valve defining said chamber, and spring means on the adjusting member urging the annular valve against the piston.

4. The improvement as claimed in claim 1 in which said piston is provided with a plurality of longitudinal bores and said means comprise an adjusting member adjustably mounted on the end of the piston rod, an annular valve against the piston over the ends of said bores, a ring having an upper face against said annular valve and the internal periphery fitting around said adjusting member to leave a flow restricting aperture between the ring and the adjusting member, said chamber being defined by said piston, the inner periphery of said annular valve, the inner periphery of said ring, said adjusting member and said piston rod, and spring means on said adjusting member urging said ring against said annular valve.

5. The improvement as claimed in claim 1 in which said piston is provided with a plurality of longitudinal bores and said means comprise an adjusting member adjustably mounted on the end of said piston rod, an annular valve against the piston over the ends of said bores having a ring depending from the inner periphery thereof fitting around said adjusting member to leave a flow restricting aperture between the ring and said adjusting member, said chamber being defined by said piston, the inner periphery of said annular valve, the inner periphery of said ring, the adjusting member and the piston rod, and spring means on said adjusting member urging said annular valve against said piston.

6. In a shock absorber having a cylinder and a piston slidable in said cylinder and mounted on the end of a piston rod which extends through said piston, that improvement comprising providing said piston with a plurality of longitudinal bores, and further comprises means on the end of said piston rod cooperating with said piston to define a chamber having a flow restricting aperture opening therefrom into said cylinder, said piston rod having at least one flow restricting passageway from the cylinder on the side of said piston opposite said means opening into said chamber, and an annular valve against said piston over the ends of said longitudinal bores having a roughened surface against said piston, and spring means urging said valve against said piston.

7. The improvement as claimed in claim 6 in which said annular valve has a plurality of circular grooves in the surface against said piston.

References Cited in the file of this patent

UNITED STATES PATENTS

| | | |
|---|---|---|
| 1,616,540 | Morgan | Feb. 8, 1927 |
| 2,410,992 | Myklestad | Nov. 12, 1946 |
| 2,469,276 | Rossman | May 3, 1949 |
| 2,507,268 | Patriquin | May 9, 1950 |
| 2,604,193 | Wyeth | July 22, 1952 |
| 2,640,564 | Cloudsley | June 2, 1953 |
| 2,678,114 | Koning et al. | May 11, 1954 |
| 2,723,006 | Wyeth | Mar. 8, 1955 |